(12) United States Patent
Kenney et al.

(10) Patent No.: US 10,014,994 B2
(45) Date of Patent: Jul. 3, 2018

(54) WIRELESS DEVICES, COMPUTER-READABLE MEDIA, AND METHODS FOR HIGH-EFFICIENCY LOCAL-AREA NETWORK (HEW) DISTRIBUTED SUB-CARRIER ALLOCATION

(71) Applicant: Intel IP Corporation, Santa Clara, CA (US)

(72) Inventors: Thomas J. Kenney, Portland, OR (US); Shahrnaz Azizi, Cupertino, CA (US); Chittabrata Ghosh, Fremont, CA (US); Eldad Perahia, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 455 days.

(21) Appl. No.: 14/669,966

(22) Filed: Mar. 26, 2015

(65) Prior Publication Data

US 2016/0173246 A1 Jun. 16, 2016

Related U.S. Application Data

(60) Provisional application No. 62/089,995, filed on Dec. 10, 2014.

(51) Int. Cl.
*H04L 5/00* (2006.01)
*H04W 72/04* (2009.01)
(Continued)

(52) U.S. Cl.
CPC .......... *H04L 5/0044* (2013.01); *H04L 5/0007* (2013.01); *H04L 5/0041* (2013.01);
(Continued)

(58) Field of Classification Search
CPC ... H04L 5/0044; H04L 5/0007; H04L 5/0041; H04B 7/0452; H04W 72/0446; H04W 84/12; H04W 72/042
See application file for complete search history.

(56) References Cited

U.S. PATENT DOCUMENTS 8,457,026 B1 * 6/2013 Ho ................... H04B 7/0617
342/359
8,724,555 B2 * 5/2014 Krishnan ............. H04L 5/0023
370/208

(Continued)

*Primary Examiner* — Noel R Beharry
*Assistant Examiner* — Ruihua Zhang
(74) *Attorney, Agent, or Firm* — Schwegman Lundberg & Woessner, P.A.

(57) ABSTRACT

Methods, devices and a computer-readable medium are disclosed for subcarrier allocation to multiple users in wireless local-area networks in accordance with orthogonal frequency division multiple access (OFDMA). A high-efficiency wireless local-area network (HEW) master device is disclosed. The HEW master device includes circuitry configured to transmit data to a plurality of HEW devices, in accordance with OFDMA, on a plurality of noncontiguous sub-channels. Each noncontiguous sub-channel may be a plurality of subcarriers across a bandwidth. A HEW device is disclosed. The HEW device may include circuitry configured to transmit data to a HEW master device, in accordance with OFDMA and a resource map, on a noncontiguous sub-channel over a bandwidth. The circuitry may be further configured to transmit the noncontiguous subcarriers at a greater power level than a regulatory power level for the plurality of interlaced subcarriers if the plurality of interlaced subcarriers were contiguous.

18 Claims, 6 Drawing Sheets

(51) Int. Cl.
 *H04B 7/0452* (2017.01)
 *H04W 84/12* (2009.01)
(52) U.S. Cl.
 CPC ......... *H04W 72/042* (2013.01); *H04B 7/0452* (2013.01); *H04W 84/12* (2013.01)

(56) References Cited

U.S. PATENT DOCUMENTS

| | | | |
|---|---|---|---|
| 2005/0128938 A1* | 6/2005 | Fang | H04L 27/2656 370/210 |
| 2010/0208681 A1* | 8/2010 | Elmaleh | H04W 16/14 370/329 |
| 2012/0263211 A1* | 10/2012 | Porat | H04L 5/0044 375/219 |
| 2015/0131517 A1* | 5/2015 | Chu | H04W 72/005 370/312 |
| 2016/0044675 A1* | 2/2016 | Chen | H03M 13/1102 370/329 |
| 2016/0057754 A1* | 2/2016 | Azizi | H04W 28/20 370/329 |

* cited by examiner

| BAND | FREQUENCY (GHh) | PERMITTED USE LOCATION | POINT-TO-POINT MAXIMUM INTENTIONAL RADIATOR POWER | MAXIMUM LIMIT OF THE PEAK POWER SPECTRAL DENSITY IN ANY 1-MHz BAND | MAXIMUM POWER PER USER, ASSUMING 1.25 MHz OF BANDWIDTH | MAXIMUM POWER PER USER, ASSUMING 5 MHz OF BANDWIDTH |
|---|---|---|---|---|---|---|
| UNII (LOW) | 5.15-5.25 | INDOOR | AP: 1W STA: 250mw (24dBm) | AP: 17 dBm STA: 11 dBm | AP: 18 dBm STA: 12 dBm | |
| | | OUTDOOR | AP: 1W (Max EIRP at elevation angle greater than 30 deg = 125 mW) STA: 250mw (24dBm) | AP: 17 dBm STA: 11 dBm | AP: 18 dBm STA: 12 dBm | STA: 18 dBm |
| UNII-2 (MIDDLE) | 5.25-5.35 | INDOOR OR OUTDOOR | 250 mW (24dBm) | 11 dBm | 12 dBm | 18 dBm |
| UNII-2 EXTENDED | 5.470-5.725 | INDOOR OR OUTDOOR | 250 mW (24dBm) | 11 dBm | 12 dBm | STA: 18 dBm 18 dBm |
| UNII-2 (UPPER) | 5.725-5.850 | INDOOR OR OUTDOOR | 1 W | 30 dBm/500kHz | Limited by Max of 1W | Limited by Max of 1W |
| | | | Mean e.i.r.p. limit [dBm] with TPC | Mean e.i.r.p. density limit [dBm/MHz] with TPC | | |
| ETSI 301 893 V1.7.0 | 5.15-5.35 | | 23 dBm | | | 17 dBm |
| | 5.470-5.735 | | 23 dBm | | | 17 dBm |

FIG. 3

WIRELESS DEVICES, COMPUTER-READABLE MEDIA, AND METHODS FOR HIGH-EFFICIENCY LOCAL-AREA NETWORK (HEW) DISTRIBUTED SUB-CARRIER ALLOCATION

PRIORITY CLAIM

This application claims the benefit of priority under 35 USC 119(e) to U.S. Provisional Patent Application Ser. No. 62/089,995, filed Dec. 10, 2014, which is incorporated herein by reference in its entirety.

TECHNICAL FIELD

Embodiments pertain to high-efficiency local-area wireless network (HEW), and some embodiments relate to Institute of Electrical and Electronic Engineers (IEEE) 802.11ax. Some embodiments relate to an orthogonal frequency division multiple-access (OFDMA) subcarrier allocation. Some embodiments relate to power usage in OFDMA.

BACKGROUND

Wireless devices communicate with one another using a wireless medium. The resources of the wireless medium are often limited, and the users of the wireless devices often demand faster communication from the wireless medium.

Moreover, often more than one standard may be in use in a wireless local-area network (WLAN). For example, IEEE 802.11 ax, referred to as high-efficiency wireless local-area networks (HEW) (WLAN), may need to be used with legacy versions of IEEE 802.11.

Therefore, there are general needs in the art to improve the operation and/or efficiency of communication between wireless devices.

BRIEF DESCRIPTION OF THE DRAWINGS

The present disclosure is illustrated by way of example and not limitation in the figures of the accompanying drawings, in which like references indicate similar elements and in which:

FIG. 3 illustrates a table of the Federal Communications Commission (FCC) power limitations for a wireless device in accordance with some embodiments;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
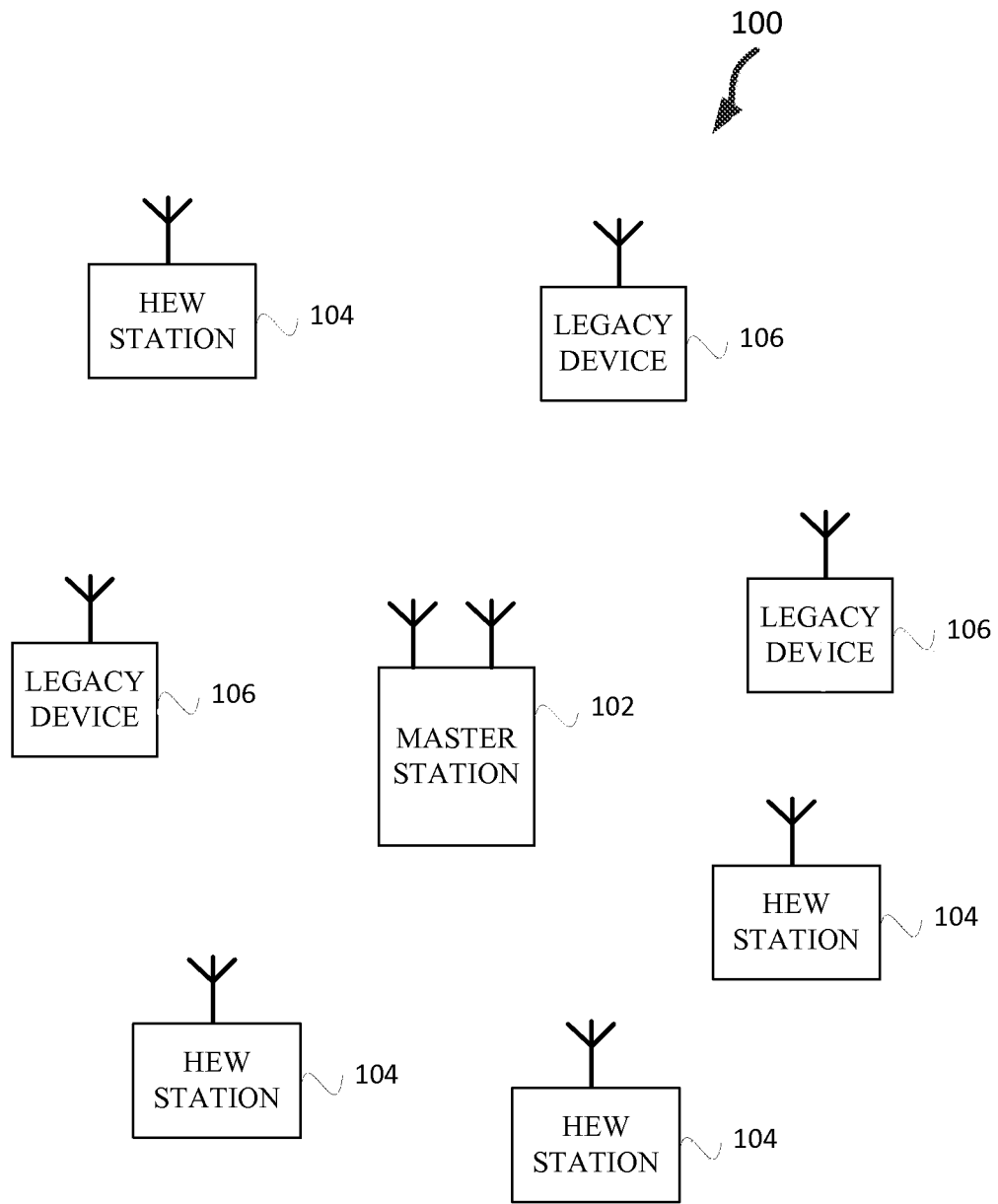
FIG. 1 illustrates a wireless network in accordance with some embodiments.

FIG. 1 illustrates a wireless network in accordance with some embodiments. The wireless local-area network (WLAN) may comprise a basis service set (BSS) 100 that may include a master station 102, which may be an access point (AP), a plurality of high-efficiency wireless (HEW) (e.g., IEEE 802.1 lax) stations 104, and a plurality of legacy (e.g., IEEE 802.11n/ac) devices 106.

The master station 102 may be an access point (AP) using the 802.11 to transmit and receive. The master station 102 may be a base station. The master station 102 may be a master station. The master station 102 may be a HEW master station. The master station 102 may use other communications protocols as well as the 802.11 protocol. The 802.11 protocol may be 802.11ax. The 802.11 protocol may include using Orthogonal Frequency-Division Multiple Access (OFDMA), time division multiple access (TDMA), and/or code division multiple access (CDMA). The 802.11 protocol may include a multiple access technique. For example, the 802.11 protocol may include space-division multiple access (SDMA) and/or multi-user (MU) multiple-input and multiple-output (MIMO)(MU-MIMO).

The HEW stations 104 may operate in accordance with 802.11ax or another standard of 802.11. The legacy devices 106 may operate in accordance with one or more of 802.11 a/g/ag/n/ac, or another legacy wireless communication standard. The HEW stations 104 may be high efficiency (HE) stations. The legacy devices 106 may be stations.

The HEW stations 104 may be wireless transmit and receive devices such as cellular telephones, handheld wireless devices, wireless glasses, wireless watches, wireless personal devices, tablets, or another device that may be transmitting and receiving using the 802.11 protocol such as 802.11ax or another wireless protocol.

The BSS 100 may operate on a primary channel and one or more secondary channels or sub-channels. The BSS 100 may include one or more master stations 102, or APs. In accordance with embodiments, the master station 102 may communicate with one or more of the HEW stations 104 on one or more of the secondary channels or sub-channels or the primary channel. In example embodiments, the master station 102 communicates with the legacy devices 106 on the primary channel. In example embodiments, the master station 102 may be configured to communicate concurrently with one or more of the HEW stations 104 on one or more of the secondary channels and a legacy device 106 utilizing only the primary channel and not utilizing any of the secondary channels.

The master station 102 may communicate with legacy devices 106 in accordance with legacy IEEE 802.11 communication techniques. In example embodiments, the master station 102 may also be configured to communicate with HEW stations 104 in accordance with legacy IEEE 802.11 communication techniques. Legacy IEEE 802.11 communication techniques may refer to any IEEE 802.11 communication technique prior to IEEE 802.11ax.

In some embodiments, a HEW frame may be configurable to have the same bandwidth, and the bandwidth may be one of 20 MHz, 40 MHz, or 80 MHz, 160 MHz, 320 MHz contiguous bandwidths or an 80+80 MHz (160 MHz) non-contiguous bandwidth. In some embodiments, bandwidths of 1 MHz, 1.25 MHz, 2.5 MHz, 5 MHz and 10 MHz, or a combination thereof, may also be used. A HEW frame may be configured for transmitting a number of spatial streams.

In other embodiments, the master station 102, HEW station 104, and/or legacy device 106 may also implement different technologies such as CDMA2000, CDMA2000 1×, CDMA2000 EV-DO, Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (Wi-MAX)), BlueTooth®, or other technologies.

In example embodiments, if the master station 102 transmits a beacon only on a primary channel, then the HEW station 104 and legacy devices 106 need to receive the beacon on the primary channel every multiple of a beacon interval (e.g., it could be every beacon interval or every 10th beacon or etc.) to maintain their synchronization with the system (e.g., master station 102).

In an OFDMA system (e.g., 802.11ax), an associated HEW station 104 may operate on a sub-channel, which may be 20 MHz, of the BSS 100 (that can operate, for example, at 80 MHz). The HEW station 104 may enter a power save mode, and upon coming out of power save mode, the HEW station 104 may need to re-synchronize with BSS 100 by receiving a beacon. If a beacon is transmitted only on the primary channel, then HEW station 104 needs to move and tune to the primary channel upon waking up to be able to receive beacons. Then the HEW station 104 needs to re-tune back to its operating sub-channels, which may be 20 MHz, or it has to follow a handshake procedure to let master station 102 know of a new operating sub-channel. The HEW station 104 may risk losing some frames during the channel switch, in example embodiments.

In example embodiments, the HEW station 104 and/or the master station 102 are configured to transmit in accordance with OFDMA, according to one or more of the embodiments disclosed herein for subcarrier allocations. For example, the master station 102 and/or HEW station 104 may be configured as described in conjunction with FIG. 3.

Some embodiments relate to high-efficiency wireless communications including high-efficiency Wi-Fi/WLAN and high-efficiency wireless (HEW) communications. In accordance with some IEEE 802.11ax (High-Efficiency Wi-Fi (HEW)) embodiments, a HEW master station may operate as a master station 102 which may be arranged to contend for a wireless medium (e.g., during a contention period) to receive exclusive control of the medium for an HEW control period (i.e., a transmission opportunity (TXOP)). The master station 102 may transmit an HEW master-sync transmission at the beginning of the HEW control period. The master station 102 may transmit a time duration of the TXOP. During the HEW control period, HEW stations 104 may communicate with the master station 102 in accordance with a non-contention-based multiple access technique. This is unlike conventional WLAN communications in which devices communicate in accordance with a contention-based communication technique, rather than a multiple access technique. During the HEW control period, the master station 102 may communicate with HEW stations 104 using one or more HEW frames. During the HEW control period, legacy stations refrain from communicating. In some embodiments, the master-sync transmission may be referred to as an HEW control and schedule transmission.

In some embodiments, the multiple-access technique used during the HEW control period may be a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations in accordance with legacy IEEE 802.11 communication techniques. In some embodiments, the master station 102 may also be configurable communicate with HEW stations 104 outside the HEW control period in accordance with legacy IEEE 802.11 communication techniques, although this is not a requirement.

Figure 2:
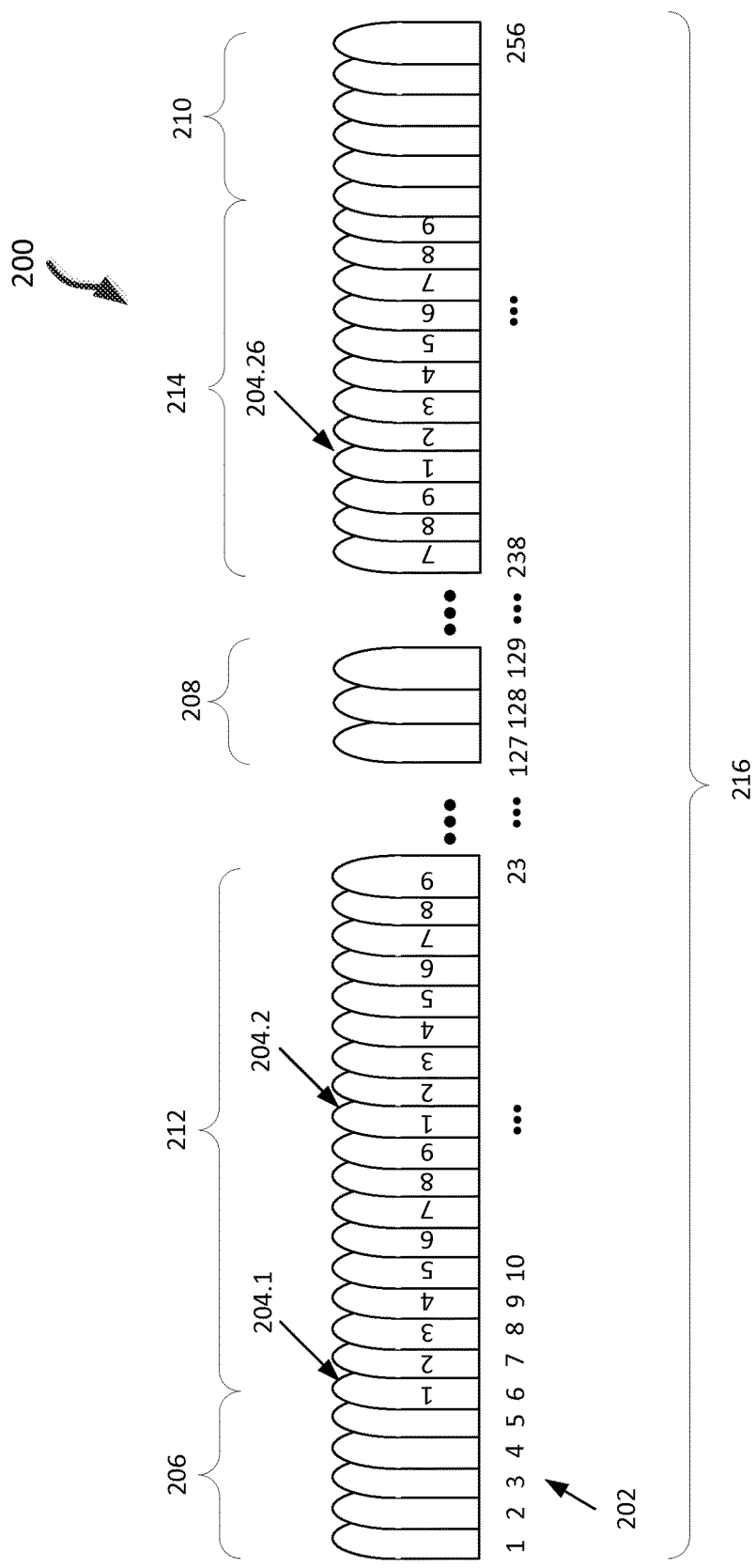
FIG. 2 illustrates an OFDMA tone allocation for distributed sub-channels in accordance with some embodiments.

FIG. 2 illustrates an OFDMA tone allocation for distributed sub-channels 200 in accordance with some embodiments. Illustrated in FIG. 2 are subcarriers 202 along the horizontal axis; distributed sub-channels 212, 214; guard subcarriers 206, 208, 210; sub-channel 1 204; and a bandwidth 216. The bandwidth 216 may be 20 MHz. The bandwidth 216 may be divided into 256 subcarriers 202. There may be five guard subcarriers 206 on one side of the bandwidth 216 and six guard subcarriers 210 on the other side of the bandwidth 216. There may be three guard subcarriers 208 in the center of the bandwidth (DC) 216. HEW station 104 and/or master station 102 may null the three guard subcarriers 208 to simplify receiver designs. Each sub-channel 212, 214 may be 26 subcarriers 202. There may be nine sub-channels 212, 214. For example, sub-channel 1 204 may be distributed across the bandwidth 216 with each of the sub-channels 212, 214 alternating the subcarriers 202. Sub-channel 1 204 may include 26 subcarriers 204.1, 204.2, through 204.26. In example embodiments, a different number of subcarriers 202 may be used for a sub-channel 212, 214.

In example embodiments, there may be fewer or more guard subcarriers 206, 208, 210, and the guard subcarriers 206, 208, 210 may be distributed differently. For example, there may be three guard subcarriers 206, three guard subcarriers 210, and eight guard subcarriers 208. One skilled in the art would recognize other distributions of the guard subcarriers 206, 208, 210 may be used, such as zero or one or more. Moreover, in example embodiments, the subcarriers 202 may be distributed among the sub-channels 212, 214. For example, one or more subcarriers 202 may separate the subcarrier allocations to users.

The sub-channels 212, 214 may be distributed differently. For example, sub-channel 1 204 may be allocated two or more continuous subcarriers 202 that are divided by one or more subcarriers 202 allocated to one or more other sub-channels 212, 214. There may be a different number of sub-channels 212, 214. Each sub-channel 212, 214 may be allocated to a different user, such as a HEW station 104. The bandwidth 216 may be 20 MHz, 40 MHz, 80 MHz, or 160 MHz. The distributed sub-channels 200 may be repeated for a number of bandwidths 216. For example, there may be four bandwidths 216 of 20 MHz each, and each bandwidth 216 may have the same distributed sub-channels 200. The sub-channels 212, 214 may be approximately 2 MHz as illustrated in FIG. 2.

As illustrated in FIG. 2, there may be eight extra subcarriers 202. In example embodiments, more subcarriers 202 may be used as guard subcarriers 208, which may have the benefit of making the OFDMA tone allocation for distributed sub-channels 200 more resilient to clock offsets. In example embodiments, extra subcarriers 202 may be used as guard subcarriers 206, 210 at the edge of the bandwidth 216, which may have the benefit of relaxing filtering requirements. In example embodiments, extra subcarriers 202 may be distributed through the bandwidth 216. For example, an extra subcarrier 202 may be used before the second subcarrier 204.2 for sub-channel 1.

In example embodiments, a 4× longer symbol duration may be used to transmit symbols on the subcarriers 202. For example, in some embodiments, the standard-duration orthogonal frequency-division multiplexing (OFDM) symbols may have a symbol duration that ranges from 3.6 micro-seconds (μs) including a 400 nanosecond (ns) short guard interval to 4 μs including an 800 ns guard interval. The HEW station 104 and/or master station 102 may be configured to transmit symbols at 14.4 μs to 16 μs.

In example embodiments, the master station 102 and/or HEW station 104 may use a 256-point fast-Fourier transform (FFT) with a symbol duration four times longer in comparison with the legacy IEEE 802.11n/ac systems, which may be used in both outdoor and indoor environments. The 4× longer symbol duration may enable use of a more efficient cyclic prefix (CP) to overcome the long delay spread in outdoor use, and in indoor use, it may enable a more relaxed requirement for clock timing accuracy.

Distributing a sub-channel 212, 214 over a larger bandwidth 216 may afford performance gains in frequency selective sub-channels by providing additional frequency diversity. The OFDMA tone allocation for distributed sub-channels 200 may be designed to increase hardware reuse of legacy devices 106. In example embodiments, the disclosed subcarrier design also increases legacy hardware reuse by reusing physical layer (PHY) xxxx.404 data flow numerology and functional blocks used in legacy devices 106 such as IEEE 802.1ah (for the smallest bandwidth) and IEEE 802.11n/ac.

The HEW station 104 and/or master station 102 may be configured to transmit and receive in accordance with the OFDMA tone allocation for distributed sub-channels 200.

The distributed sub-channels 212, 214 may enable users of the sub-channels 212, 214 such as HEW stations 104 and/or master stations 102 to use a greater transmission power. The greater transmission power may enable a greater operating range for the HEW station 104 and/or master station 102, and/or a higher throughput with a modulation and coding scheme that may provide a greater throughput.

In example embodiments, the master station 102 may send an indication to the HEW station 104 of a subcarrier allocation. The master station 102 and HEW station 104 may share a table that indicates different subcarrier allocations.

FIG. 3 illustrates a table 300 of the Federal Communications Commission (FCC) power limitations for a wireless device in accordance with some embodiments. The table 300 may illustrate FCC regulation 15.407. The table 300 includes a point-to-point maximum intentional radiator power 302. For example, the point-to-point maximum intentional radiator power 302 may be a maximum of 24 Decibel-milliwatts (dBm). The table 300 also includes a maximum limit of the peak power spectral density in any 1-MHz band 304. For example, a per 1 MHz band maximum of 11 dBm. The table 300 also includes maximum power per user, assuming 1.25 MHz of bandwidth 306. For example, a maximum of 12 dBm. The table 300 may also include a maximum power per user assuming 5 MHz power of bandwidth 308. For example, a limitation of 18 dBm. By distributing the subcarriers across a greater bandwidth than the indicated bandwidth of 1, 1.25, or 5 MHz 308, a HEW station 104 and/or master station 102 can increase the power to transmit the subcarriers. For example, a HEW station 104 may increase the power used to transmit the 26 subcarriers illustrated in FIG. 2 from 18 dBm to 24 dBm and still be within the FCC power limitations. Moreover, for smaller subcarrier allocations (e.g., 14 subcarriers) that fall below 1.25 MHz 306, a HEW station 104 may increase the power from 12 dBm to 24 dBm. Additionally, for subcarrier allocations (e.g., 12 subcarriers) that fall below 1 MHz, the power may be increased from 11 dBm to 24 dBm. The increased power may provide many benefits as described herein.

Figure 4:
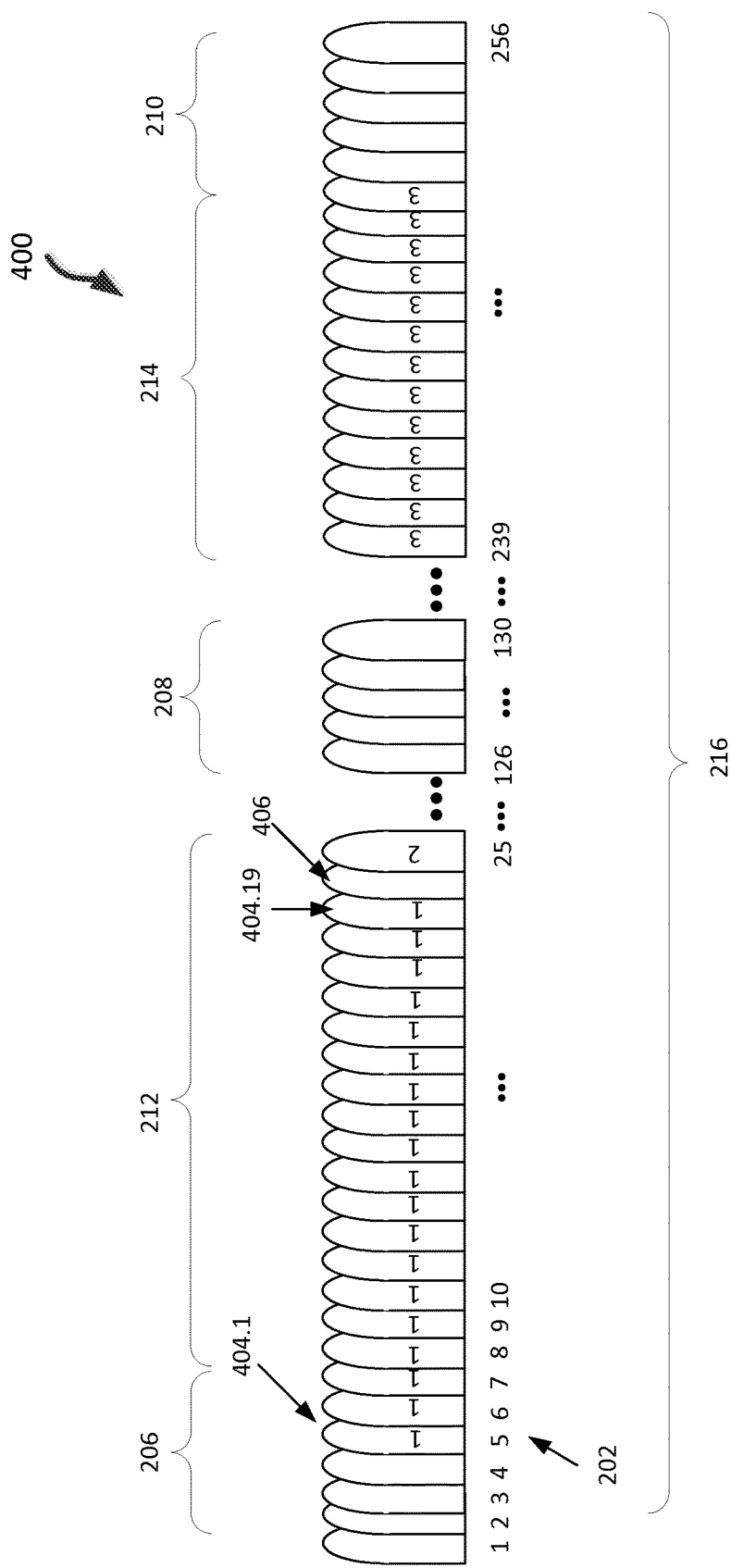
FIG. 4 illustrates an OFDMA tone allocation for distributed sub-channels in accordance with some embodiments.

FIG. 4 illustrates an OFDMA tone allocation for distributed sub-channels 400 in accordance with some embodiments. Illustrated in FIG. 4 are subcarriers 202 along the horizontal axis; distributed sub-channels 212, 214; guard subcarriers 206, 208, 210; sub-channel 1 404; and a bandwidth 216. The bandwidth 216 may be 20 MHz. The bandwidth 216 may be divided into 256 subcarriers 202. There may be four guard subcarriers 206 on one side of the bandwidth 216 and five subcarriers 210 on the other side of the bandwidth 216. There may be five guard subcarriers 208 in the center of the bandwidth (DC) 216. HEW station 104 and/or master station 102 may null the five guard subcarriers 208 to simplify receiver designs.

Each sub-channel 212, 214 may be 78 subcarriers. There may be three sub-channels 212, 214. For example, sub-channel 1 404 may be distributed across the bandwidth 216 with each of the sub-channels 212, 214 alternating 19 subcarriers 202 with one guard subcarrier 406 between each group of 19 subcarriers. Sub-channel 1 204 may include 78 subcarriers with a first group of 19 subcarriers 404.1 through 404.19.

Figure 5:
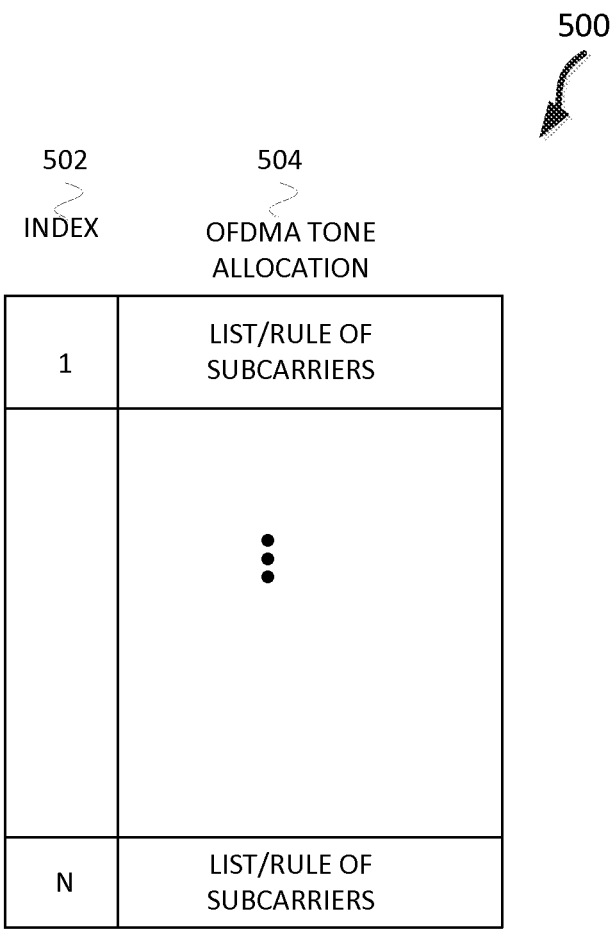
FIG. 5 illustrates a configuration table that indicates an OFDMA tone allocation based on an index, in accordance with some embodiments.

FIG. 5 illustrates a configuration table 500 that indicates an OFDMA tone allocation based on an index 502 in accordance with some embodiments. The configuration table 500 may be a table that is shared by the master station 102 and the HEW station 104. The index 502 may be an index into the configuration table 500. The OFDMA tone allocation 504 may be a tone allocation for bandwidth. For example, the OFDMA tone allocation 504 could be a list of subcarriers that may not be contiguous. As another example, the OFDMA tone allocation 504 may be a rule that indicates the tone allocation is the first five subcarriers and then skip 35 subcarriers and then the next five subcarriers are part of the allocation and to repeat this pattern throughout a sub-channel or multiple sub-channels.

Figure 6:
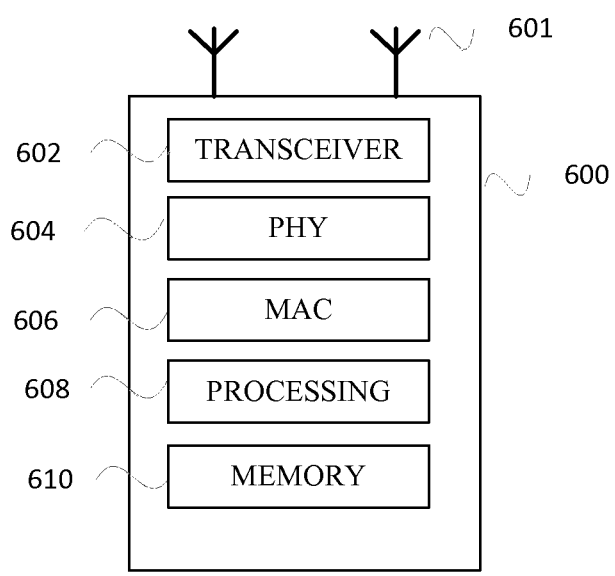
FIG. 6 illustrates a HEW station and/or master station, in accordance with some embodiments.

FIG. 6 illustrates a HEW station and/or master station 600 in accordance with some embodiments. HEW station and/or master station 600 may be an HEW-compliant device that may be arranged to communicate with one or more other HEW devices, such as HEW stations 104 (FIG. 1) or master station 102 (FIG. 1) as well as communicate with legacy devices 106 (FIG. 1). HEW stations 104 and master station 102 may also be referred to as HEW devices. HEW station and/or master station 600 may be suitable for operating as the master station 102 (FIG. 1) or an HEW station 104 (FIG. 1). In accordance with embodiments, HEW station and/or master station 600 may include, among other things, a transmit/receive element such as an antenna 601, a transceiver 602, physical layer (PHY) circuitry 604 and medium-access control layer circuitry (MAC) 606. PHY circuitry 604 and MAC 606 may be HEW-compliant layers and may also be compliant with one or more legacy IEEE 802.11 standards. MAC 606 may be arranged to configure physical protocol data units (PPDUs) and arranged to transmit and receive PPDUs, among other things. HEW station and/or master station 600 may also include other hardware processing circuitry 608 and memory 610 configured to perform the various operations described herein. The processing circuitry 608 may be coupled to the transceiver 602, which may be coupled to the transmit/receive element 601. While FIG. 6 depicts the processing circuitry 608 and the transceiver 602 as separate components, the processing circuitry 608 and the transceiver 602 may be integrated together in an electronic package or chip.

In some embodiments, the MAC 606 may be arranged to contend for a wireless medium during a contention period to receive control of the medium for the HEW control period and configure an HEW PPDU. In some embodiments, the MAC 606 may be arranged to contend for the wireless medium based on channel contention settings, a transmitting power level, and a clear channel assessment (CCA) level.

The PHY circuitry 604 may be arranged to transmit the HEW PPDU. The PHY circuitry 604 may include circuitry for modulation/demodulation, upconversion/downconversion, filtering, amplification, etc. In some embodiments, the hardware processing circuitry 608 may include one or more processors. The hardware processing circuitry 608 may be configured to perform functions based on instructions being stored in a RAM or ROM, or based on special-purpose circuitry. In some embodiments, the hardware processing circuitry 608 may be configured to perform one or more of the functions described herein in conjunction with FIGS. 1-6.

In some embodiments, two or more antennas 601 may be coupled to the PHY circuitry 604 and arranged for sending and receiving signals including transmission of the HEW packets. The HEW station and/or master station 600 may include a transceiver 602 to transmit and receive data such as HEW PPDU and packets that include an indication that the HEW station and/or master station 600 should adapt the channel contention settings according to settings included in the packet. The memory 610 may store information for configuring the other circuitry to perform operations for configuring and transmitting HEW packets and performing the various operations described herein in conjunction with FIGS. 1-5, such as generating and operating in accordance with one or more of the embodiments of the subcarrier designs and/or generating a resource allocation that uses one or more of the subcarrier designs.

In some embodiments, the HEW station and/or master station 600 may be configured to communicate using OFDM communication signals over a multicarrier communication channel. In some embodiments, HEW station and/or master station 600 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the disclosed embodiments is not limited in this respect as they may also be suitable to transmit and/or receive communications in accordance with other techniques and standards. In some embodiments, the HEW station and/or master station 600 may use four times the symbol duration of 802.11n or 802.1ac.

In some embodiments, the HEW station and/or master station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, a master station 102, a television, a medical device (e.g., a heart rate monitor, a blood pressure monitor, etc.), a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas 601, a graphics processor, an application processor, speakers, and other mobile device elements. The display may be an LCD screen including a touch screen.

The antennas 601 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 601 may be effectively separated to benefit from spatial diversity and the different channel characteristics that may result.

Although the HEW station and/or master station 600 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The following examples pertain to further embodiments. Example 1 is a high-efficiency wireless local-area network (HEW) master station. The HEW master station includes circuitry configured to transmit to each HEW station of a plurality of HEW stations a resource map that indicates an allocation of a noncontiguous sub-channel of a plurality of noncontiguous sub-channels, and transmit data to the plurality of HEW stations, in accordance with orthogonal frequency division multiple access (OFDMA) and the resource map, on the plurality of noncontiguous sub-channels.

In Example 2, the subject matter of Example 1 can optionally include where each noncontiguous sub-channel is a plurality of subcarriers across a bandwidth.

In Example 3, the subject matter of Examples 1 and 2 can optionally include where the plurality of noncontiguous sub-channels is interlaced by alternating sub-carriers from different noncontiguous sub-channels of the plurality of noncontiguous sub-channels.

In Example 4, the subject matter of Example 3 can optionally include where the plurality of noncontiguous sub-channels is 26 subcarriers and the bandwidth is 20 MHz with 256 subcarriers.

In Example 5, the subject matter of Example 4 can optionally include where the plurality of noncontiguous sub-channels is nine interlaced sub-channels, and wherein subcarriers of the 256 subcarriers that are not part of the plurality of interlaced sub-channels are allocated from a center of the bandwidth (DC) and edges of the bandwidth.

In Example 6, the subject matter of Example 5 can optionally include where the 20 MHz bandwidth includes three subcarriers allocated for the center of the bandwidth (DC), five guard subcarriers on one end of the 20 MHz bandwidth and six guard subcarriers on another end of the 20 MHz bandwidth.

In Example 7, the subject matter of any of Examples 1-6 can optionally include where at least one of the noncontiguous sub-channels comprises a subcarrier allocation that is distributed over a bandwidth of one of the following group: 20 MHz, 40 MHz, 80 MHz, and 160 MHz interlaced with one or more other noncontiguous subcarrier allocations.

In Example 8, the subject matter of any of Examples 1-7 can optionally include where at least two of the noncontiguous sub-channels comprises a subcarrier allocation of blocks of contiguous subcarriers interleaved with other blocks of contiguous subcarriers allocated to a different subcarrier allocation.

In Example 9, the subject matter of any of Examples 1-8 can optionally include where the circuitry is further configured to receive data from each of the plurality of HEW stations, in accordance with OFDMA and the resource map, on the plurality of noncontiguous sub-channels.

In Example 10, the subject matter of any of Examples 1-9 can optionally include where the resource map indicates the allocation based on a configuration table shared between the plurality of HEW stations and the HEW master station.

In Example 11, the subject matter of any of Examples 1-10 can optionally include where the HEW master station is one from the following group: an access point and a HEW station.

In Example 12, the subject matter of any of Examples 1-11 can optionally include where the circuitry is further configured to transmit with a 4× symbol duration compared with an Institute of Electronic and Electrical Engineers (IEEE) 802.11 ac symbol duration.

In Example 13, the subject matter of any of Examples 1-12 can optionally include memory coupled to the circuitry.

In Example 14, the subject matter of Example 13 can optionally include one or more antennas coupled to the circuitry.

Example 15 is a method on a high-efficiency wireless local-area network (HEW) master station. The method may include transmitting data to a plurality of HEW stations, in accordance with orthogonal frequency division multiple access (OFDMA), on a plurality of noncontiguous sub-channels.

In Example 16, the subject matter of Example 15 can optionally include where each noncontiguous sub-channel is a plurality of subcarriers across a bandwidth.

In Example 17, the subject matter of Example 16 can optionally include where the plurality of noncontiguous sub-channels is interlaced by alternating sub-carriers of each of a plurality of interlaced sub-channels.

In Example 18, the subject matter of any of Examples 15-17 can optionally include transmitting to each HEW station of the plurality of HEW stations a resource map that indicates an allocation of a noncontiguous sub-channel of the plurality of noncontiguous sub-channels, and wherein the transmitting data is further in accordance with the resource map.

Example 19 is a high-efficiency wireless local-area network (HEW) station. The HEW station may include circuitry configured to transmit data to a HEW master station, in accordance with orthogonal frequency division multiple access (OFDMA), and a resource map, on a noncontiguous sub-channel over a bandwidth.

In Example 20, the subject matter of Example 19 can optionally include where the noncontiguous sub-channel comprises a plurality of interlaced subcarriers, and wherein the circuitry is further configured to transmit the interlaced subcarriers at a greater power level than a regulatory power level for the plurality of interlaced subcarriers if the plurality of interlaced subcarriers were contiguous.

In Example 21, the subject matter of Examples 19 or 20 can optionally include where the noncontiguous sub-channel comprises a subcarrier allocation of blocks of contiguous subcarriers interleaved with other blocks of contiguous subcarriers allocated to a different HEW station.

In Example 22, the subject matter of any of Examples 19-21 can optionally include where the subcarrier is 26 subcarriers and the bandwidth is 20 MHz with 256 subcarriers.

In Example 23, the subject matter of any of Examples 19-22 can optionally include memory coupled to the circuitry and one or more antennas coupled to the circuitry.

Example 24 is a non-transitory, computer-readable storage medium that stores instructions for execution by one or more processors to perform operations for communication by a wireless communication station. The instructions may configure the one or more processors to cause the wireless communication station to transmit data to a plurality of HEW stations, in accordance with orthogonal frequency division multiple access (OFDMA), on a plurality of noncontiguous sub-channels.

In Example 25, the subject matter of Example 24 can optionally include where each noncontiguous sub-channel is a plurality of subcarriers across a bandwidth.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) access point (AP), the apparatus comprising: memory, and processing circuitry coupled to the memory, processing circuitry configured to:
    configure the HE AP to transmit a resource map that indicates for each HE station of a plurality of HE stations an orthogonal frequency division multiple access (OFDMA) tone allocation of a noncontiguous sub-channel of a plurality of noncontiguous sub-channels, wherein each noncontiguous sub-channel is a plurality of subcarriers across a bandwidth, and wherein the plurality of noncontiguous sub-channels is interlaced by sub-carriers from different noncontiguous sub-channels of the plurality of noncontiguous sub-channels; and
    configure the HE AP to transmit data to the plurality of HE stations, in accordance with OFDMA and the resource map, on the plurality of noncontiguous sub-channels, wherein the resource map comprises an index with an integer value, wherein the integer value indicates a row of a configuration table, and wherein the row indicates a corresponding OFDMA tone allocation for each of the HE stations.

2. The apparatus of claim 1, wherein the plurality of noncontiguous sub-channels is 26 subcarriers and the bandwidth is 20 MHz with 256 subcarriers.

3. The apparatus of claim 2, wherein the plurality of noncontiguous sub-channels is nine interlaced sub-channels, and wherein subcarriers of the 256 subcarriers that are not part of the plurality of interlaced sub-channels are allocated from a center of the bandwidth (DC) and edges of the bandwidth.

4. The apparatus of claim 3, wherein the 20 MHz bandwidth includes three subcarriers allocated for the center of the bandwidth (DC), five guard subcarriers on one end of the 20 MHz bandwidth and six guard subcarriers on another end of the 20 MHz bandwidth.

5. The apparatus of claim 1, wherein at least one of the noncontiguous sub-channels comprises a subcarrier allocation that is distributed over a bandwidth of one of the following group: 20 MHz, 40 MHz, 80 MHz, and 160 MHz interlaced with one or more other noncontiguous subcarrier allocations.

6. The apparatus of claim 1, wherein at least two of the noncontiguous sub-channels comprises a subcarrier allocation of blocks of contiguous subcarriers interleaved with other blocks of contiguous subcarriers allocated to a different subcarrier allocation.

7. The apparatus of claim 1, wherein the processing circuitry is further configured to:
receive data from each of the plurality of (HE) stations, in accordance with OFDMA and the resource map, on the plurality of noncontiguous sub-channels.

8. The apparatus of the (HE) master station of claim 1, wherein the HE AP is one from the following group:
an access point and a HE station.

9. The apparatus of claim 1, wherein the processing circuitry is further configured to:
transmit with a 4× symbol duration compared with an Institute of Electronic and Electrical Engineers (IEEE) 802.11ac symbol duration.

10. The apparatus of claim 1, further comprising one or more antennas coupled to the processing circuitry.

11. The apparatus of claim 1, wherein the memory is configured to store the data and the resource map.

12. A method performed on an apparatus of a high-efficiency (HE) access point (AP), the method comprising:
configuring the HE AP to transmit a resource map that indicates for each HE station of a plurality of HE stations an orthogonal frequency division multiple access (OFDMA) tone allocation of a noncontiguous sub-channel of a plurality of noncontiguous sub-channels, wherein each noncontiguous sub-channel is a plurality of subcarriers across a bandwidth, and wherein the plurality of noncontiguous sub-channels is interlaced by sub-carriers from different noncontiguous sub-channels of the plurality of noncontiguous sub-channels; and
configuring the HE AP to transmit data to a plurality of HE stations, in accordance with OFDMA and the resource map, on the plurality of noncontiguous sub-channels, wherein the resource map comprises an index with an integer value, and wherein the integer value indicates a row of a configuration table that indicates a corresponding OFDMA tone allocation for each of the HE stations.

13. An apparatus of a high-efficiency (1-E) station, the apparatus comprising: memory; and, processing circuitry coupled to the memory, processing circuitry configured to:
decode a resource map, wherein the resource map comprises an index with an integer value, wherein the integer value indicates a row of a configuration table that indicates an orthogonal frequency division multiple access (OFDMA) tone allocation of a noncontiguous sub-channel of a plurality of noncontiguous sub-channels;
configure the HE station to transmit data to a HE access point (AP), in accordance with OFDMA, and on the noncontiguous sub-channel over a bandwidth, wherein the noncontiguous sub-channel comprises a plurality of interlaced subcarriers, and wherein the noncontiguous sub-channel comprises a subcarrier allocation of blocks of contiguous subcarriers interleaved with other blocks of contiguous subcarriers allocated to a different HE station; and
configure the HE station to transmit the interlaced subcarriers at a greater power level than a regulatory power level for the plurality of interlaced subcarriers if the plurality of interlaced subcarriers were contiguous.

14. The apparatus of claim 13, wherein the subcarrier is 26 subcarriers and the bandwidth is 20 MHz with 256 subcarriers.

15. The apparatus of claim 13, further comprising memory coupled to the processing circuitry and one or more antennas coupled to the processing circuitry.

16. The apparatus of claim 13, wherein the memory is configured to store the data.

17. A non-transitory, computer-readable storage medium that stores instructions for execution by one or more processors of a high-efficiency (HE) access point (AP), the instructions to configure the one or more processors to:
configure the HE AP to transmit a resource map that indicates for each HE station of a plurality of HE stations an orthogonal frequency division multiple access (OFDMA) tone allocation of a noncontiguous sub-channel of a plurality of noncontiguous sub-channels, wherein each noncontiguous sub-channel is a plurality of subcarriers across a bandwidth, and wherein the plurality of noncontiguous sub-channels is interlaced by sub-carriers from different noncontiguous sub-channels of the plurality of noncontiguous sub-channels; and
configure the HE station to transmit data to a plurality of high-efficiency HE stations, in accordance with OFDMA, on the plurality of noncontiguous sub-channels, wherein the resource map comprises an index with an integer value, wherein the integer value indicates a row of a configuration table, and wherein the row indicates a corresponding OFDMA tone allocation for each of the HE stations.

18. The non-transitory, computer-readable storage medium of claim 17, wherein the plurality of noncontiguous sub-channels is 26 subcarriers and the bandwidth is 20 MHz with 256 subcarriers.

* * * * *